Patented Mar. 14, 1950

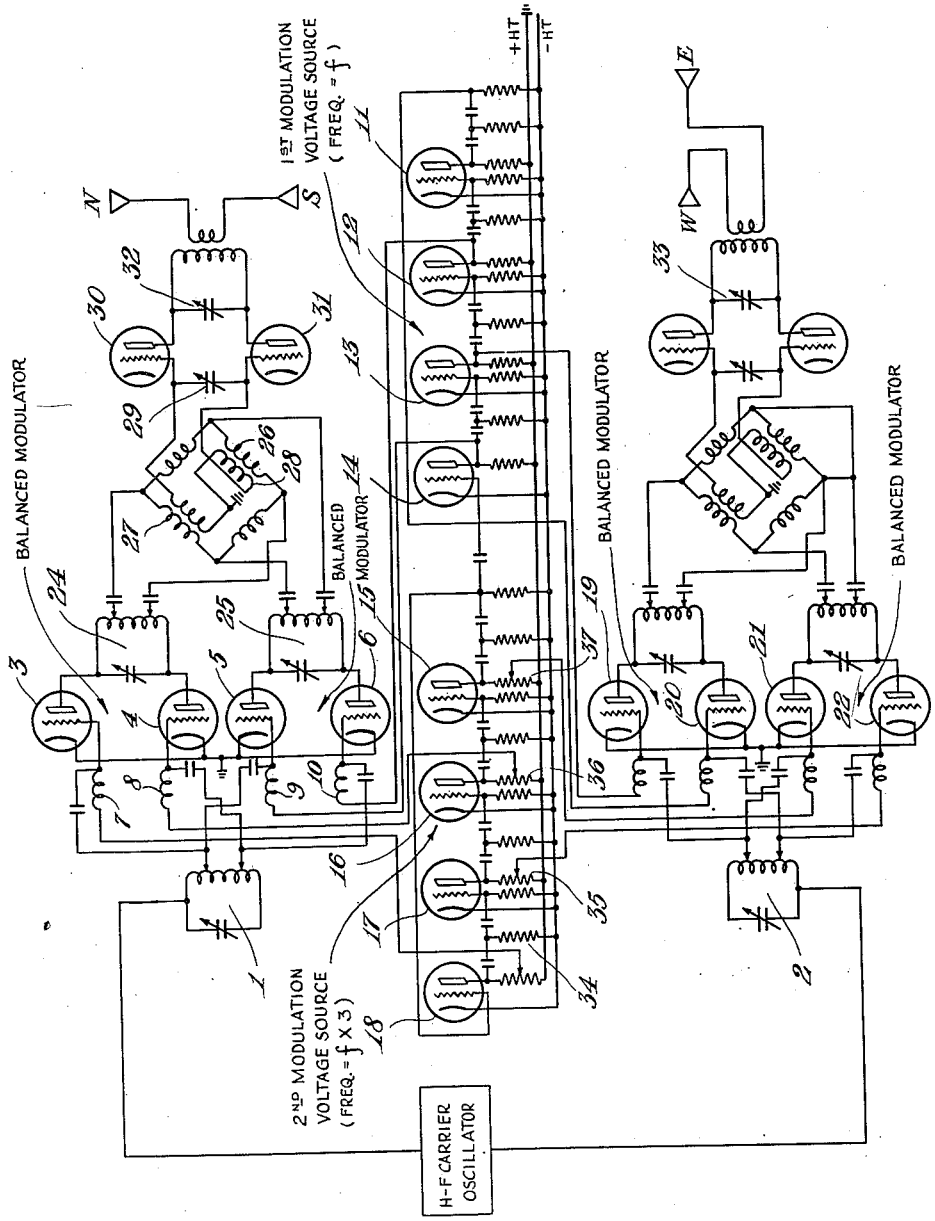

2,500,793

UNITED STATES PATENT OFFICE 2,500,793

ROTATING FIELD RADIO BEACON

Claude Bourgonnier, deceased, late of Paris, France, by Marguerite Lucie Julienne Bourgonnier-Brichaux, executrix, Paris, France, assignor to Hartford National Bank and Trust Company, Hartford, Conn., as trustee Application December 31, 1947, Serial No. 794,922
In France June 12, 1943

Section 1, Public Law 690, August 8, 1946
Patent expires June 12, 1963

5 Claims. (Cl. 343—106)

This invention relates to an arrangment for coursemarking radiation comprising a rotating-field aerial-system and a rotating-field modulator which is controlled by phase-displaced components of a modulating sinusoidal voltage.

In system of this kind, distortions in the bearing diagrams of the aerials used in the rotating-field aerial-system, which may be due to, for example, the heterogeneity of the surface of the earth, the presence of metal bodies, stray reflections and the like, are known to result in divergences from the desired uniform velocity of rotation of the rotating fields.

For the purpose of correcting divergences from the desired uniform velocity of rotation of the rotating field it is known to feed to the rotating-field modulator modulating voltages which are obtained from a rotary sliding contact of a wire-wound potentiometer, the winding pitch from winding to winding being chosen experimentally to be such as to ensure uniform velocity of rotation.

The invention has for its object to simplify the production of a uniform rotating field of rotation.

According to the invention, for this purpose means are provided for producing a higher harmonic, particularly the first odd harmonic, of the modulating voltage, said higher harmonic voltage being used as the correcting rotating-field modulation-voltage.

The rotating-field correction-voltage is preferably deducted from an oscillator circuit to which the rotating-field modulating-voltage is fed as the synchronising voltage.

An especially suitable embodiment of coursemarking radiation according to the invention is due to the use of a rotating-field modulator which comprises, in addition to the two well-known push-pull modulators, which have fed to them components of the rotating-field modulation-voltage displaced in phase by 90°, two further push-pull modulators which have fed to them components of the correction rotating-field modulating-voltage displaced in phase by 90°, the output circuits of corresponding push-pull modulators being connected, via a bridge circuit which serves for de-coupling the output circuits, to the corresponding aerial of the rotating-field aerial-system.

In order that the invention may be more clearly understood and readily carried into effect it will now be explained more fully with reference to the accompanying drawing.

The beacon transmitter shown in the figure comprises four push-pull modulators which will be referred to by the reference numerals of the modulator tubes 3—4, 5—6, 19—20, 21—22 and which have fed to them via resonant circuits 1 and 2 a carrier wave oscillation generated by a high frequency alternator.

The push-pull modulators 5—6 and 19—20 constitute a rotating-field modulator whis has fed to it components of a rotating-field modulation-voltage displaced by 90°. This modulation voltage is obtained from a low frequency RC-oscillator 11, 12, 13, 14 and is fed via high-frequency chokes directly to the control grids of the modulator tubes 5—6 and 19—20. Feeding the modulation voltages to the grids of the modulator tubes in this manner without the use of blocking condensers is desirable with a view to avoiding phase displacements or distortions of the rotating-field modulation-voltages which in general have a very low frequency, for example 1 cycle per minute. For this reason the plate voltage of the low frequency oscillator is connected to earth.

Owing to distortions of the bearing diagrams of the aerials used in the rotating-field aerial-system, which is constituted for example by two Adcock-aerials at right angles to each other, said distortions being liable to be due to the heterogeneity of the surface of the earth, the presence of metal bodies, stray reflections and so forth, the emitted rotating-field will no longer rotate uniformly. In practice it has been found that in the case of thorough construction of the aerials used and of correct arrangement of the rotating-field aerial-system the divergence from the uniform velocity of rotation of the rotating field is substantially proportional to the first odd harmonic of the modulation frequency.

In order to correct this divergence from the uniform velocity of rotation of the rotating field, the beacon transmitter comprises two further push-pull modulators 3—4 and 21—22 which have fed to them components, displaced in phase by 90°, of the correction rotation-field modulation voltage having the frequency that corresponds to the first odd harmonic of the rotation-field modulation frequency. This correction rotation-field modulation-voltage is deducted from a low-frequency RC-oscillator 15, 16, 17, 18 which is arranged in the same manner as the above-described oscillator 11, 12, 13, 14 and is synchronised by the latter oscillator, it being possible for this correction modulation voltage to be adjusted to the correct value by means of potentiometers 34, 35, 36 and 37.

The modulated oscillations occurring in the output circuit of the push-pull modulators 3—4, 5—6 and 19—20, 21—22 respectively are fed by means of a bridge circuit acting as a de-coupling network via a push-pull amplifier to the corresponding aerial of the rotation field-aerial system, the bridge circuit also serving for suppression of the carrier wave frequency of the modulated oscillations.

Consider to this end, for example, bridge circuit 26 which is built up from four identical coils to the corners of which are fed modulated oscillations from the output circuits 24 and 25 of the push-pull modulators 3—4 and 5—6. Passing in diametrically opposed bridge branches are currents which are proportional to the difference or the sum of the voltages occurring in the resonant circuits 24 and 25. Since in the resonant circuits 24 and 25 the carrier wave oscillations occur in phase, the carrier oscillation will be suppressed in a pair of diametrically opposed bridge branches. The oscillations occurring in these diametrically opposed bridge branches are fed, via a coupling coil constituted by two parts 27 and 28 and shunted by a condenser 29, to the grids of two push-pull amplifier valves 30 and 31 the output circuit 32 of which is coupled to the pertinent aerial of the rotation-field aerial-system.

What is claimed is:

1. A rotating field radio beacon arrangement comprising a carrier wave source, a first modulation voltage source, first modulator means, means to apply said carrier wave as an input to said first modulator means, means to apply said first modulation voltage in phase quadrature as an input to first modulator means to combine with said carrier wave, a rotary field antenna system coupled to first modulator means to radiate a field rotating at a rate corresponding to the frequency of said first voltage, a second modulation voltage source having a frequency corresponding to the first odd harmonic of said first voltage, second modulator means, means to apply said second modulation voltage in phase quadrature as an input to said second modulator means to combine with said carrier wave, the output of said second modulator means being coupled to said antenna system to radiate a field rotating at a rate corresponding to said second voltage, and means to adjust the relative amplitude of the phase quadrature components of the second modulation voltage applied to said second modulator means.

2. A rotating field radio beacon arrangement comprising a carrier wave source, a first modulation voltage source, a first pair of balanced modulators, means to apply said carrier wave as an input to said first pair of balanced modulators, means to apply said first modulation voltage in phase quadrature as an input to first pair of modulators to combine with said carrier wave, a rotary field antenna system coupled to first pair of modulators to radiate a field rotating at a rate corresponding to the frequency of said first voltage, a second modulation voltage source having a frequency corresponding to the first odd harmonic of said first voltage, a second pair of balance modulators, means to apply said second modulation voltage in phase quadrature as an input to said second pair of modulators to combine with said carrier wave, the output of said second pair of modulators being coupled to said antenna system to radiate a field rotating at a rate corresponding to said second voltage, and means to adjust the relative amplitude of the phase quadrature components of the second modulation voltage applied to said second pair of modulators.

3. An arrangement, as set forth in claim 2, wherein said antenna system is constituted by an Adcock aerial having one set of radiators coupled to one set of corresponding modulators in said first and second pair and having an opposing set of radiators coupled to the other set of corresponding modulators in said first and second pair.

4. An arrangement, as set forth in claim 3, wherein said one set of corresponding modulators are coupled through a bridge network to said one set of radiators and wherein said other set of modulators are coupled through a second bridge network to the opposing set of radiators, said bridge network being arranged to avoid interaction between said modulators.

5. An arrangement, as set forth in claim 4, further including means to maintain said first and second modulation voltage sources in synchronism.

MARGUERITE LUCIE JULIENNE
BOURGONNIER-BRICHAUX,
Executrix of the Estate of Claude Bourgonnier, Deceased.

REFERENCES CITED

The following references are of record in the file of this patent:

UNITED STATES PATENTS

| Number | Name | Date |
|---|---|---|
| 2,377,902 | Relson | June 12, 1945 |
| 2,422,110 | Luck | June 10, 1947 |